J. R. PEIRCE.
MECHANISM FOR MECHANICALLY TRANSFERRING ITEMS OF ACCOUNTS.
APPLICATION FILED AUG. 23, 1906. RENEWED JUNE 20, 1917.
1,253,417.
Patented Jan. 15, 1918.
7 SHEETS—SHEET 1.
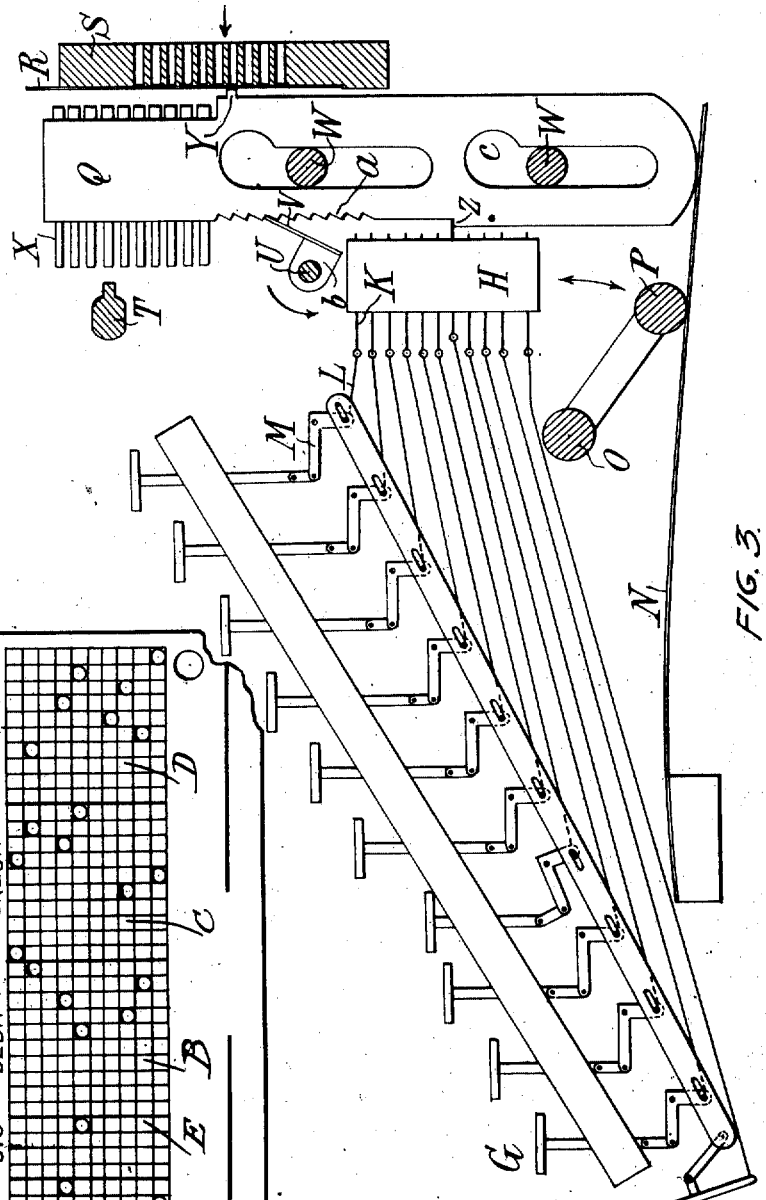
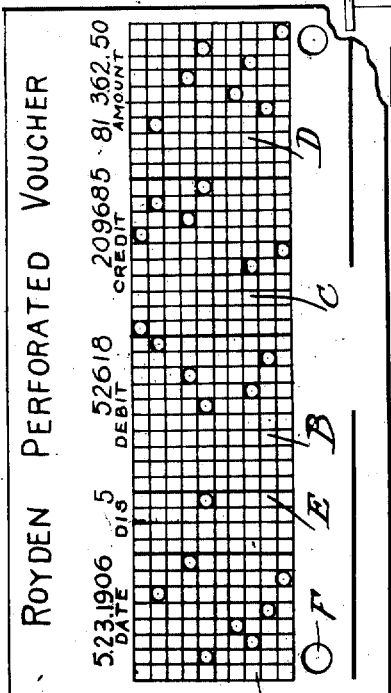

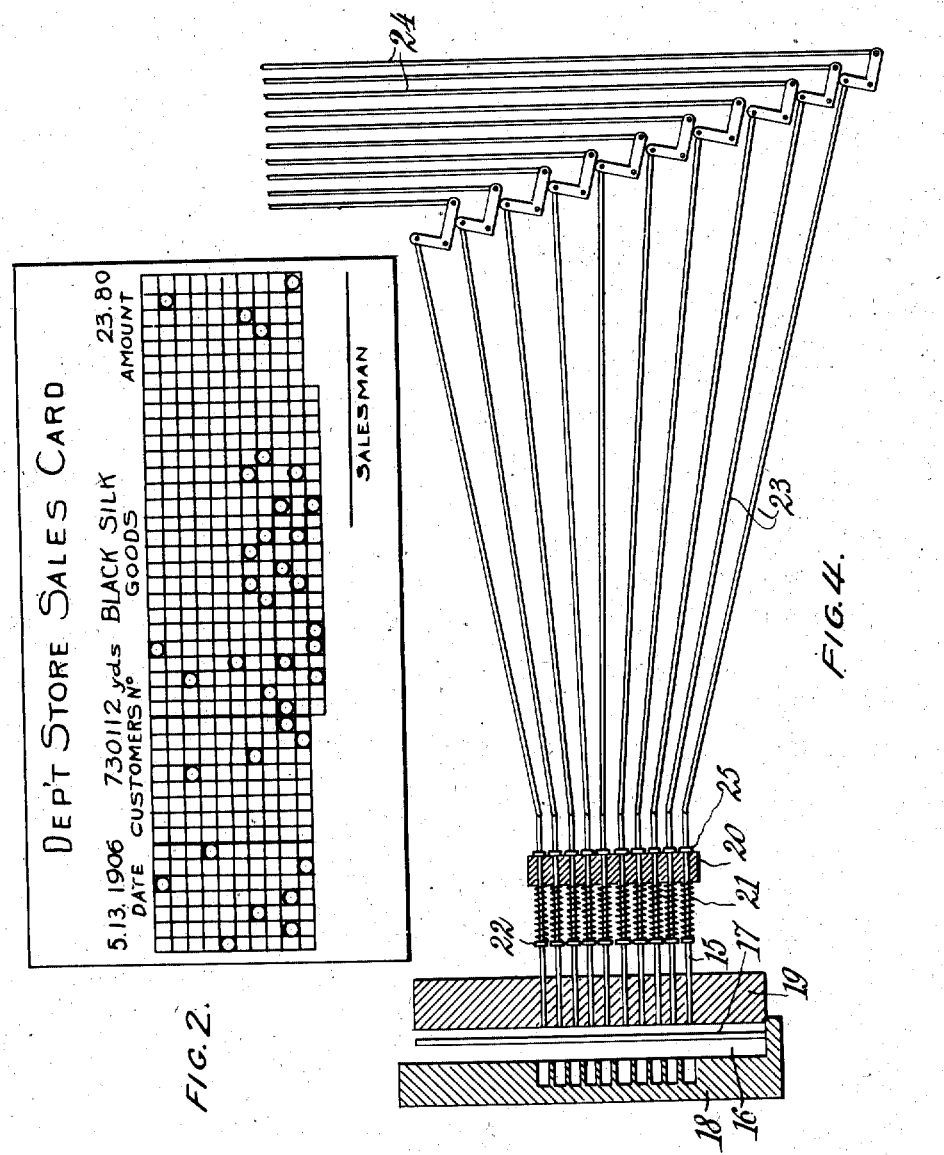

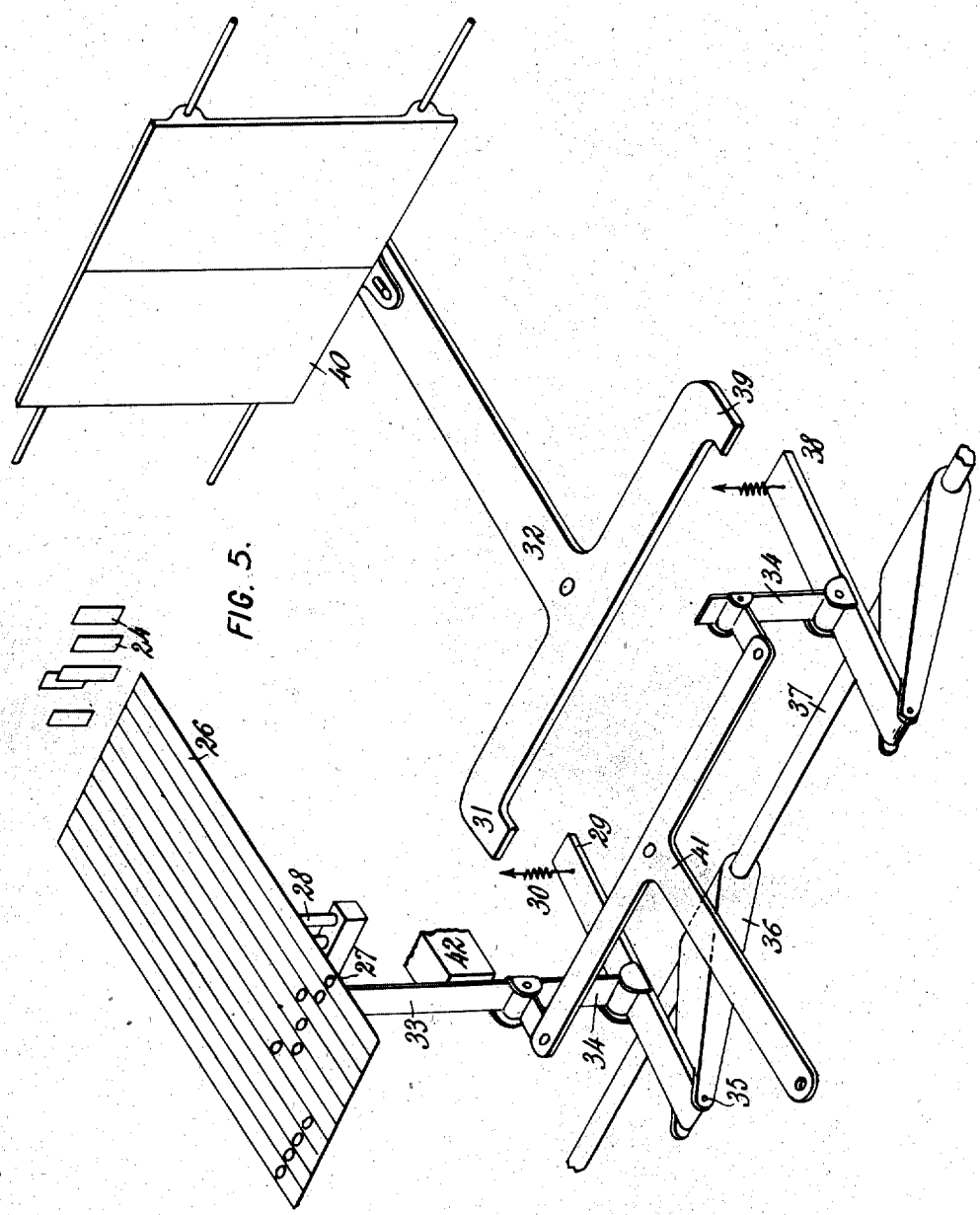

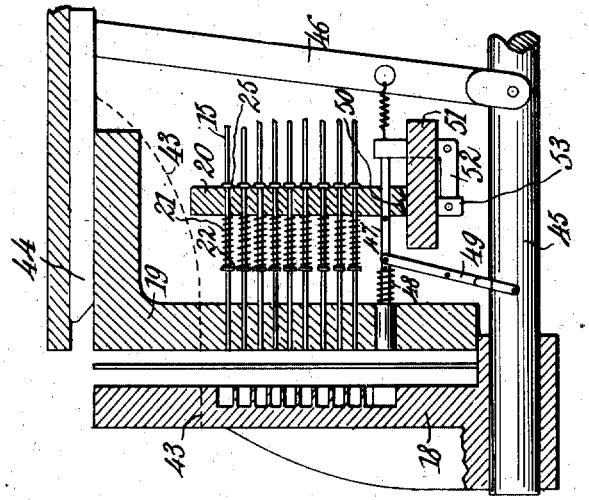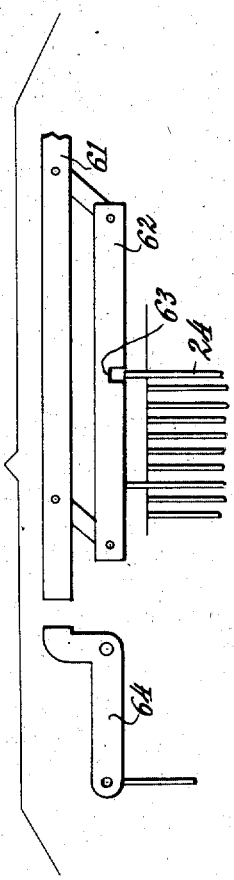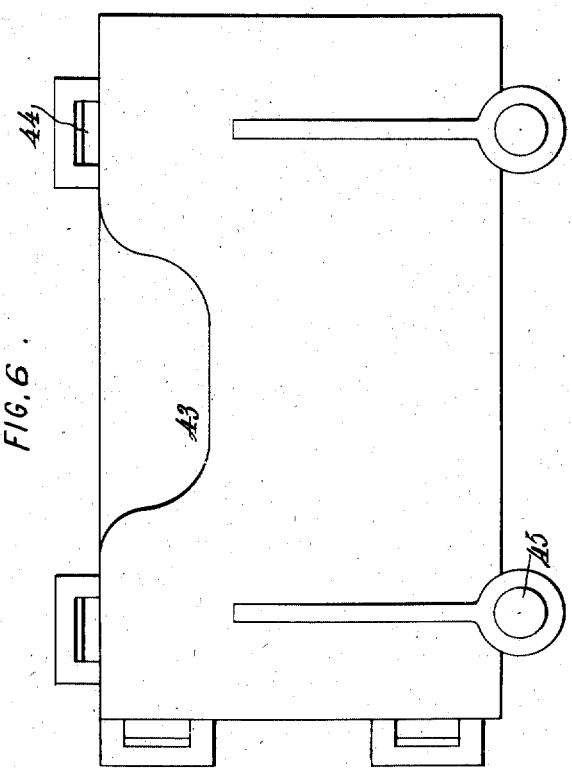

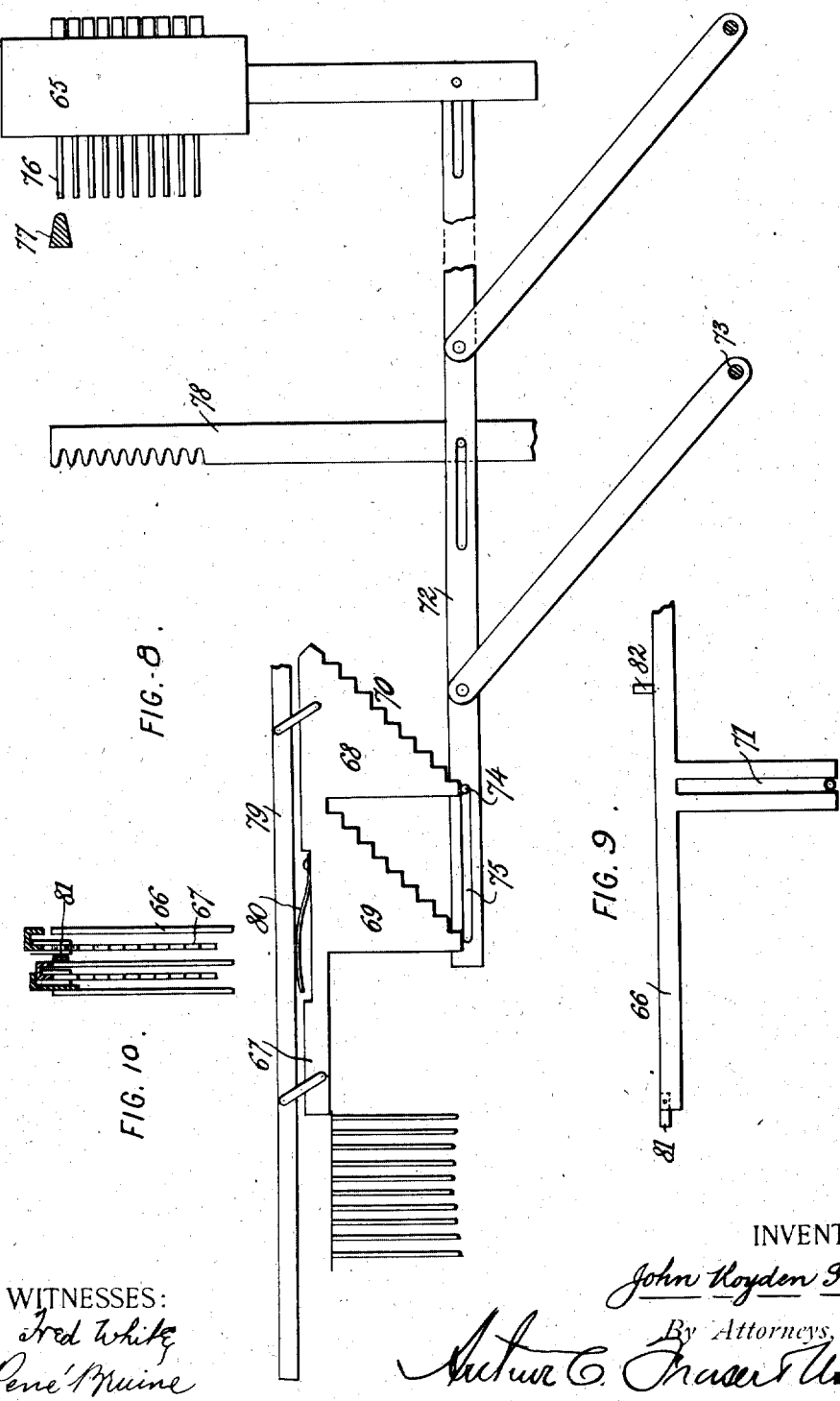

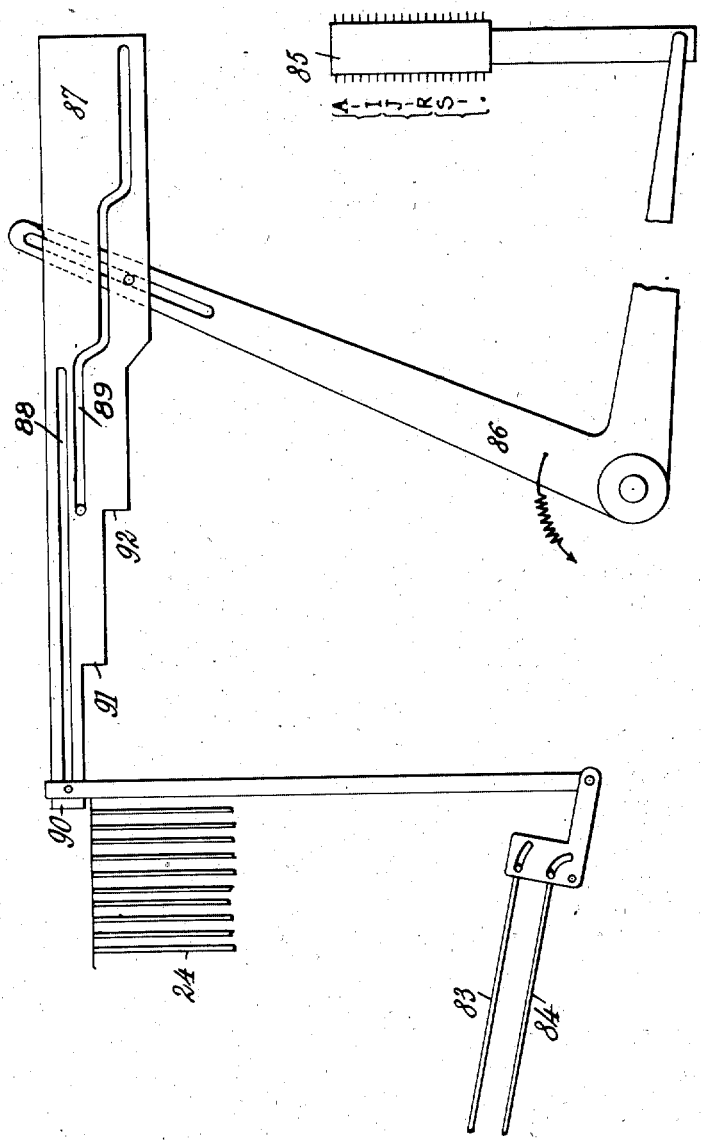

J. R. PEIRCE.
MECHANISM FOR MECHANICALLY TRANSFERRING ITEMS OF ACCOUNTS.
APPLICATION FILED AUG. 23, 1906. RENEWED JUNE 20, 1917.

1,253,417.

Patented Jan. 15, 1918.

WITNESSES:

INVENTOR:
John Royden Peirce,
By Attorneys,

UNITED STATES PATENT OFFICE.

JOHN ROYDEN PEIRCE, OF NEW YORK, N. Y.

MECHANISM FOR MECHANICALLY TRANSFERRING ITEMS OF ACCOUNTS.

1,253,417.   Specification of Letters Patent.   Patented Jan. 15, 1918.

Application filed August 23, 1906, Serial No. 331,757. Renewed June 20, 1917. Serial No. 175,974.

*To all whom it may concern:*

Be it known that I, JOHN ROYDEN PEIRCE, a citizen of the United States, residing in the borough of Manhattan, city, county, and State of New York, have invented certain new and useful Improvements in Mechanism for Mechanically Transferring Items of Accounts or the like, of which the following is a specification.

In my application for Patent No. 821,050, filed June 9, 1906, I have described and claimed a mechanical system for keeping accounts, according to which a suitably perforated card serves as a controller for reproducing the item in a listing, adding, billing or other printing machine. The present invention comprises the mechanism by which the system is executed, including the card, the mechanism for perforating it, and the mechanism controlled by the perforated card for reproducing the item. At the same time the present invention provides for a number of operations not disclosed in the aforesaid application.

The separate mechanisms are also in some cases capable of independent use, and capable of uses not necessarily connected with the keeping of accounts. The mechanism for setting the punches may, for example, be advantageously used for setting type. The "card" referred to may be any sheet, leaf or ribbon of light cardboard or other material, and the final reproduction may be effected upon any desired medium, the term "sheet" being used here in a sense to include any such medium.

The accompanying drawings illustrate more or less diagrammatically the principal parts of mechanisms embodying the invention.

Figure 1 illustrates the card used with or as an ordinary voucher or bill;

Fig. 2 a department store sales card;

Fig. 3 is a longitudinal vertical sectional view of the perforating machine showing the details of one unit or column of digits thereon;

Fig. 4 is a similar view of a unit of the selecting or stop mechanism of the reproducing machine controlled by the card;

Fig. 5 is a perspective view of the mechanism for automatically or manually setting the machine to print at either the debit or the credit side of the sheet;

Figs. 6 and 7 are respectively an elevation and a transverse section of the card pocket;

Fig. 8 is a longitudinal sectional view showing the minuend bar of a subtracting mechanism such as is used in connection with meter cards, pay roll cards, etc.;

Fig. 9 is a similar view of the subtrahend bar;

Fig. 10 is a transverse view showing two pairs of bars in juxtaposition;

Fig. 11 shows a device for checking the operation when two cards in a subtracting machine have different debtor numbers;

Fig. 12 is a transverse sectional view parallel to and illustrating diagrammatically one unit of a machine for printing the letters of the alphabet, especially applicable to the department store card shown;

Fig. 13 is a face view of a card which I call a complete voucher;

Fig. 14 is a face view of a modified card.

Cards.

The cards shown are merely types of a great variety of cards which may be used. The ruling of the squares shown is not essential, and indeed will be preferably omitted. It is introduced here to indicate more clearly the relative position and significance of each perforation.

Each card is divided into a number of sections corresponding to the several words or items which are to be reproduced. Each section of the card is divided either by the actual lines shown, or by imaginary lines, into a number of columns representing the successive decimal places of a number, as units, tens, hundreds, &c., and each column is divided into ten squares representing from the bottom upward the successive digits 0, 1, 2, 3, &c. A single perforation is punched in each column to indicate the desired digit of the corresponding place in the printed number. At the same time the number itself is also printed in juxtaposition to the section of the card at which it is punched, so that the card is readable in the ordinary way without having to translate the punches. In many cases names, such as those of a debtor and creditor, may be represented by numbers, but there are cases, as in describing the goods in a department store statement, where letters of the alphabet must be used, and in such a case it is only necessary to make the punches according to a slightly more complicated system without substantially increasing the height of the card.
The cards are capable of use in a variety of ways which will readily suggest themselves. The principal method of use which I propose, is to serve as means for reproducing an item in the office of the person who makes up a card, or in the office of any debtor or creditor to whom the card may be sent.

The voucher card of Fig. 1, for example, is designed to be sent with an ordinary bill, and is provided with spaces A, B, C and D, showing respectively the date, the (arbitrary) number of the debtor and that of the creditor, and the amount of the bill; and preferably also with a space E indicating the distribution of the item in the creditor's books as for rent, services, or the like. The numbers represented by the perforations in the several sections of the card are printed above the respective sections by the same mechanism which makes the punches, so that there can be no conflict between the punch and the corresponding number. One or more additional perforations F may be provided for determining accurately the location of the card in the reproducing machine, as hereinafter described. Spaces may be left on the card for the signatures of persons verifying or otherwise marking the card.
It is proposed with this system that every firm or individual using it shall have a particular number, so that all cards which he as a debtor shall receive, will have this number in the debtor division. Of course all cards which he as a creditor sends out will have the same number in the creditor division. If more than one system of identifying numbers is used, as for example a national and an international system, instead of the left hand row of the debit and credit sections of the machine, there is substituted a key connected with the type having a star or other indicator which the operator shall print upon the card when he is using a corresponding code or system of numbers. In order to make it easy to determine what the numbers represent, it is proposed to adopt a system whereby numbers between certain limits are adopted for certain classes of users. For example, national, State and municipal corporations or departments may be considered one class, banks, trust companies and the like another, railroads and connected offices another, and the numbers between the two determined limits might be so distributed as to convey additional information, geographical or otherwise.

Cards for indicating the meter reading of gas companies, and the mechanism for making and using such cards, are described and claimed fully in my application for Patent No. 441,618, filed July 2, 1908 (Patent No. 1,110,643 of September 15, 1914.)

Pay roll cards and mechanism for making and using them, are described and claimed in my application No. 427,859 filed April 18, 1908.

The department store sales card (Fig. 2) presents no substantial distinction from the ordinary voucher card, except that in order to indicate the goods it is necessary to use letters of the alphabet. In order to avoid too greatly enlarging the card, I propose to use a slightly more complicated but very compact system of punches for this purpose. The alphabet is divided into three parts of 9 letters each, so that the three divisions will be as follows:—

| 1st div. | 2nd div. | 3rd div. |
|----------|----------|----------|
| I | R | . |
| H | Q | Z |
| G | P | Y |
| F | O | X |
| E | N | W |
| D | M | V |
| C | L | U |
| B | K | T |
| A | J | S |

The appropriate section of the card is divided (preferably by imaginary lines) into a suitable number of columns each having 11 squares. The lower 2 are supplementary and serve to indicate whether the letter represented is in the first, second or third division. If the lowermost square is punched, a letter in the third division is indicated; if the second lowest square is punched, a letter in the second division; and if neither of the lowest two squares are punched, the first division. The proper one of the three divisions of the alphabet being indicated, the successive squares above the two supplementary ones correspond to the successive letters A, B, C, &c., J, K, L, &c., or S, T, U, &c.

The listing machine is arranged for control by this alphabetical system.

In addition to the types of cards shown, an almost infinite variety of cards may be designed for different businesses, as for example in banks, savings banks, clearing houses, postal money orders, freight bills, stock brokers' tickets, tax statements, time cards of all sorts, telephone bills, and the like.

The parts of the perforating, listing and billing machines illustrated are designed for application to the Wales adding machine. The essential principles of my improvement, however, can be applied readily to any of the adding machines now in the market, the Wales being chosen because its mechanism is more easily adapted to the perforated system. On account of this universal applicability to a variety of mechanisms, only the novel or essential elements of the new combinations are fully described.

*The perforating mechanism.*

This instrument is equipped with a regular adding machine key-board having ten decimal places and ten digits in each decimal place, or 100 keys in all. In addition to these there may be special keys such as one for making a star or other indication of a particular system of numbers for individuals, and one making a perforation which shall transform a debit card into one making a credit register.

A carriage carries the card and also the printing type and perforating punches, so that these are movable with respect to the keys. The keys set the type and punches in their operative positions, and a hammer or similar mechanism, carried by the carriage, impresses the type upon the card or pushes the punches therethrough after these parts have been set by the keys. The purpose of this movement of the type and punches relative to the keys, is to permit one bank of keys to serve in succession as the carriage is shifted from one end to the other for setting the type and punches for each of the several divisions of the card. For example, with the voucher card of Fig. 1, the carriage is pushed to the extreme right and the type and punches corresponding to its left hand division corresponding to the date, are engaged with the key-board, or are in position to be operated by the key-board. The key-board being now operated or set to the date, the type and punches are correspondingly set. Thereupon a trip is operated which allows the carriage to slide along to bring its next division under the influence of the key-board. At each advance the key-board is released. When all the items have been set the handle of the machine is operated, the types are impressed upon the card, and the punches pushed therethrough. Upon returning the carriage to its first position, such sections or columns as the operator wishes are released. Those which are not to be changed, such as the date, are retained in the position to which they have been set by the keys.

Referring to Fig. 3, the stationary parts of the mechanism are the keys G, guide block H, slides K, and connecting links L and crank levers M, the springs N (one for each column of keys) operating shaft O and crank arm P normally holding down the springs N and lifted to release said springs when it is desired to move the type carrying bars up.

The movable carriage carries a number of type bars Q corresponding to the total number of columns on the card. Partaking of the lateral movement of the carriage are the card R, the card pocket at which the perforated back plate is indicated at S, the hammers T, and the shaft U carrying spring pawls V; and the supports for the various parts such as the rods W which determine the vertical movement of the type bars Q. Each type bar carries a series of types X held backward by springs and adapted to be thrown forward by the hammer T, and carries also a punch Y. The hammer T is at a fixed height a short distance above the uppermost perforation in the back plate S, and the punch Y is so arranged relatively to the several types X as to punch a hole in a card in a space corresponding to the type which stands in horizontal line with the hammer, and which is impressed upon the card. The proper key in a column having been pressed, forces out a corresponding pin or stop K, and this operation is first accomplished for all the keys for any division of the card. Thereupon the rod P is swung backward, releasing the springs, which lift the type bars Q until each type bar stops with its shoulder Z against the projecting pin K. The pawl V engages a suitable one of the teeth $a$ of the type bar to hold it to the position to which it is elevated; thereupon the operating shaft O is turned in the opposite direction, the keys which have been pressed down are released and spring up, and the carriage moves to position to set the type bars of the next division. This operation is repeated for each division, after which a suitable device is operated to swing the hammers T against the types and to press the perforated back S with the card against the punch, thus punching and printing at one operation. There are as many springs V as there are columns upon the card, but all the springs of any one division of the card are mounted upon a single sleeve $b$. After the punching of the first card the sleeve corresponding to the date division of the card, and the creditor division and any others, may be left undisturbed, thus holding the type bars in place while the sleeves belonging to the other divisions are turned to withdraw their springs V from the ratchet teeth $a$, and to let the type bars drop.

When any key in any column is pressed, the last of the pins K is forced out and prevents the type bar from rising. When the perforated back S is pushed against the type bars, any type bar which is in this position is pushed back, the widened upper ends of the slots c allowing a lateral movement of the type bar. None of the types is opposite the hammer, and no figure is printed and no perforation is made.

Listing mechanism.

Where a single card has a single division thereon punched to represent an amount, the mechanism for reproducing this amount I have called a listing mechanism; the name "billing mechanism" being applied to a machine which prints the difference between two amounts punched on a single card, or on two separate cards which are in the machine at once. The listing mechanism is illustrated in Figs. 4 to 7 inclusive. Fig. 4 illustrates mechanism which may replace the key-board of an ordinary Wales adding machine, in order to adapt the machine to the purpose desired. The figure, it will be understood, represents one unit of the machine corresponding to one column of spaces in the card. A column of pins 15 are arranged to project into a pocket 16, or to be withdrawn therefrom, the card 17 being held in said pocket by the bringing of the movable wall 18 up against the fixed wall 19.

When the handle of the machine is operated it effects a series of movements. The first movement advances the outer plate 18. The second movement advances toward the card a slide 20 which presses a series of individual springs 21 against fixed collars 22 on the several pins 15. All the pins are thus pressed against the cards by their springs, and the pin in each column which registers with the perforation, slips forward, pulling on its link 23 and throwing its rod 24 up above a determined level, so that it serves as a stop for the sliding or swinging member which determines the type to be printed. When the lever of the machine is reversed the slide 20 is drawn back and restores the pin 15 which has been moved forward, fixed collars 25 being provided for this purpose on the pins in the rear of the slide 20.

The automatic device for throwing the sheet to the right or left according as the amount is to be debited or credited, is indicated in Fig. 5. The stops 24 are thrown up by the perforations in the card, one of the stops being in each column, and the slides 26 are moved in the direction of the arrow by springs until they come to rest against the stops 24, each slide moving to a position depending on the position of the punch in the corresponding column of the card. Suppose the group of stops 24 shown to represent the creditor division of the card, and the slides 26 shown to represent the corresponding slides. Then the mechanism is so arranged that when the punches in the creditor division of the card correspond to the party who made the card, the slides 26 will take such positions against the stops 24 as to bring a series of notches on the under sides of the slides all into one transverse line, or to bring an equivalent series of perforations 27 all into one transverse line. Under the slides 26 and pressed upward, is a transverse bar adapted to move up into the several notches referred to when they come into line with each other and with the transverse bar, or a transverse series of pins 28 may be arranged to similarly enter the perforations 27. A striker 29 is pulled upward by a spring 30 and is adapted when lifted to lie in the plane of an end 31 of a T-lever 32, but when depressed lies below the plane of said lever. The pins 28 are pivotally connected to the striker 29 through the medium of a vertical support 33, 34. The rear end of the striker 29 is pivoted at 35 to an arm 36 on a shaft 37, which may be the main operating shaft of the machine, or may be suitably connected thereto. Another striker 38 in position to engage the opposite arm 39 of the T-lever is controlled in a similar way by the stops and slides corresponding to the debtor division of the card.

Now when the card is put into the machine and the pins pressed against it and the stops 24 thrown up, the slides 26 move forward, bringing the perforations 27 into line and allowing the pins 28 to enter and the striker 29 to rise. The movement of the shaft 37 then causes the striker 29 to strike the end 31 of the lever, and to throw the carriage 40 in the direction of the arrow, so as to bring the debit column in line with the type which ought to print the amount.

The automatic mechanism may be thrown out and the position of the carriage determined by hand. For this purpose a horizontal lever 41 has its handle projecting within reach of the operator, and is pivoted at the ends of its opposite arms to the lower portions 34 of the vertical members connected to the strikers. By swinging the lever in a direction to withdraw the members 34 from engagement with the members 33, one striker or the other is allowed to spring up into position to engage the corresponding arm of the T-lever 32. The movement of the T-lever to one side or the other causes the operation of the debit or credit mechanism (which may be of any usual or suitable construction).

In case the user's number does not appear correctly perforated in either the debtor or creditor section of the card, then another one of the strikers will move and the machine will refuse to operate.

A part of the frame-work 42 prevents the rise of one of the members 34 when the hand lever 41 is operated. Upon placing the hand lever in its middle position, the card again controls automatically the debit and credit mechanism.

This debit and credit mechanism is of great value in various other fields than that specifically described. For example it may be applied to any of the present adding machines, and would prove of great benefit in taking off trial balances. Furthermore the selective function of this mechanism may be utilized to pick out numbers or items of any account. By placing suitable strips between the strikers 29 and 38, intermediate positions might be determined for the debit and credit frame corresponding to additional columns appearing upon the ledger card. Thus in all statistical work any number or series of numbers can be taken cognizance of and tabulated, omitted, or handled in any desired manner.

*Card pocket.*—A suitable pocket for the card and the mechanism adjacent thereto is illustrated in detail in Figs. 6 and 7. The space 16 receives the card 17 as previously explained, and the outer wall 18 of the pocket is movable toward and away from the inner wall 19 through which the pins 15 project. To permit the quick removal and replacement of a card, the upper edge and the left hand edge of the space 16 are open, and a large opening 48 is provided in the upper edge of the plates 18 and 19. The openings 43 allow the operator to hold the card in his hands until it is pressed to its final position, and even, if he chooses, to hold it during its tabulation. The card is locked in place by means of four clamps 44, two for each of the open edges of the space, having beveled ends. When the pocket is open the ends of the clamps are flush with the face of the inner side 19 of the pocket. But when the plate 18 is moved inward the clamps 44 are simultaneously moved outward and come to their effective clamping position just before the card is pressed tightly between the walls 18 and 19 of the pocket. The movement of the clamps is effected through a rod 45 connected to the outer wall of the pocket, and one or more levers 46.

As an additional safeguard, I may use any desired number of placing pins 47, one of which is shown in Fig. 7, and which are adapted to enter corresponding perforations in the card to insure its correct registry with the bank of pins. The placing pin 47 is pressed forward by a spring 48, which in turn is attached to one end of a lever 49, the outside end of which is connected to a rod 45. If the placing pin 47 fails to enter a perforation, a toothed catch 50 engages a fixed member 51 and prevents the pusher 20 from moving forward to operate the pins in the manner previously explained. But if the pin fits a perforation in the card and passes through it, it operates a bell-crank lever 52, which by means of a rod 53 lifts the catch 50 from the fixed member 51 and allows the pusher 20 to be moved forward in the regular way. If therefore the pusher plate 20 cannot move forward, the handle of the machine cannot operate, and the operator will know at once that the wrong card is in the machine.

Billing mechanism.

A suitable mechanism for this purpose is illustrated in Figs. 8, 9, 10, 11 and 12. It is understood that where no alphabetical type are to be printed the mechanism of Fig. 12 may be omitted, and that the subtracting mechanism of the other figures is not necessary, except where a subtracting operation is to be made in printing the bill.

Referring first to the checking device in Fig. 11, this device is added to prevent the operation of the machine where two cards of different debtor or consumer numbers are introduced into the machine for the purpose of making up a bill to a certain debtor. The series of pins 24 are controlled directly by the perforations in the debtor sections of the cards. If the two cards have identical debtor numbers, then in each column of pins 24 there will be but a single pin raised, and when the compound bar composed of the parts 61 and 62 slides in the direction of the arrow, the notch 63 in the lower bar will fall upon the appropriate pin 24 and the movement of the bar will stop. If, however, there be two pins 24 in any one column elevated at the same time (which can only occur when there are two different debtor columns), the bar 62 cannot drop, and the compound bar will slide along until it strikes a lever 64 which trips a catch in the printing mechanism and prevents it from operating. It is understood that a single bank of pins 24 is so arranged as to be operated by perforations in the debtor section of either one of two cards.

The pins or stops 24 in the subtracting mechanism of Fig. 8 are controlled by the perforations of the cards as previously explained. They are so arranged, however, that alongside the first column of the minuend is placed the first column of the subtrahend. Similarly the second, third, and other decimal places of the two numbers whose difference is to be taken, are arranged to lie alongside of each other alternately. Any suitable motion-transmitting arrangement may be used for transmitting motions induced by the separated sections of the card or cards to the common compound system of pins 24. For each decimal place in the difference, that is, for each pair of columns of pins 24, and for each single type plate 65, two feeler bars are provided; a subtrahend bar 66 and a minuend bar 67, their positions alongside of each other being best indicated in Fig. 10.

Imagining the columns of pins 24 to represent the digits indicated at their lower ends, it will be seen that when the minuend is greater than the subtrahend (in the same decimal column) the spaces between the two pins 24 is the difference. However, if the minuend is the lesser, the difference will be inversely as the spaces between the two pins 24 which are operated; if there is one space the difference will be 9, if two spaces the difference will be 8, etc.

The minuend feeler bars 67 are provided with a pair of triangular plates 68 and 69, the upper sides of which are horizontal, while one side is vertical and one under side is oblique and formed with a series of ten steps 70. The subtrahend bar 66 has a long vertical slot 71. The type plate 65 is raised by a bar 72 arranged to have a parallel movement as the operating handle rotates the shaft 73 in the direction of the arrow. A pin 74 is carried by the bar 72, and adapted to have a horizontal movement relatively thereto, but to be carried vertically with the bar 72, the desired connection being by means of a horizontal slot 75 in the bar, in which the pin 74 runs loosely. The pin projects on both sides of the bar, the projection at one side lying within the slot 71 of the subtrahend bar, and the projection at the other side lying in the plane of the corresponding minuend bar. Its horizontal motion is therefore controlled by the slot 71 in the subtrahend bar, and its vertical motion by the step 70, which lies in line with the slot 71 for any relative position of the two bars 66 and 67. The possible amount of vertical movement of the pin 74 and the bar 72 is therefore determined by the relative position of the minuend and subtrahend bars; and the height to which the type plate 65 is lifted when the shaft 73 is turned corresponds to the height of the pin 74. According as the type plate 65 with the types 76 is lifted, one or the other of the types comes into line with the hammer 77, and upon the complete operation of the machine this hammer moves forward, impressing the type upon the paper. In the upward movement of the bar 72, or in the subsequent downward movement, a rack 78 operates the adding wheels in the manner usual in adding machines.

Whatever the position of the two pins 24 of two adjacent columns, if the minuend is the greater then the pin 74 when it is lifted will strike one of the steps in the plate 68 (the parts being shown at the zero position for both the minuend and the subtrahend). If the minuend is the smaller of the two members then it will be drawn backward from the position shown (that is, backward relatively to the subtrahend bar), and the pin 74 when it rises will strike one of the steps of the plate 67. As the minuend bar moves backward from the zero position relatively to the subtrahend bar, the first step to which the pin 74 rises indicates 9, the next step 8, etc., the quantity thus diminishing as the distance increases, thus providing for the inverse relation previously found necessary.

When the minuend is smaller than the subtrahend, it is necessary to reduce the minuend (or increase the subtrahend) of the next decimal place by 1. To accomplish this I may use a bar 79 fastened with a parallel movement to the minuend bar 67 and pressed upward by a spring 80, and operating in connection with a pivoted extension 81 on the subtrahend bar of the next higher column of figures. A fixed lateral extension 82 is provided upon each subtrahend bar 66 extending over its minuend bar 67, adapted normally to lie in the rear of said minuend bar and adapted to engage a portion of the latter when the pin 74 moves to the left of the zero position shown, and to press down the bar 79. The bar 79 in turn engages a small lug on the extension 81 and presses the lug down at the same time as the bar 79 moves down, and thus lifts the outer end of the extension high enough to clear it from touching the projecting pin 24. When the extension 81 is lifted the end of the subtrahend bar 66 is one space shorter than before, and the result of this is to make the movement of the subtrahend bar of the next higher decimal place one unit greater than it would otherwise be, and at the same time to bring the pin 74 of the next column one step beyond its previous position.

*Alphabet mechanism.*—For printing letters of the alphabet with cards perforated according to the compound system previously described, a suitable mechanism is shown diagrammatically in Fig. 12. The pins or stops 24 are controlled by the regular series of perforations in the card, corresponding to the successive letters in an undetermined division of the alphabet; and the selection of the proper division of the alphabet is determined either by the operation of the pins 24 alone, or by the operation of one or the other of the rods 83, 84, controlled respectively by the two supplementary perforations of the card. The type plate 85 carries the type indicated, and will be under control of a hammer and other suitable and well known mechanism; and is raised to the proper point by any suitable mechanism, typified by a lever 86 whose movement is determined by a slide 87. This slide is provided with a pair of slots 88, 89, running upon fixed pins and insuring a horizontal or parallel movement of the slide in all positions. If neither one of the rods 83, 84, is operated, but only one of the pins 24, then the slide 87 will move forward under the pressure of the usual spring until the end 90 strikes the elevated pin or stop 24. If, however, simultaneously with the elevation of one of the pins 24 the rod 83 is pulled, then the slide 87 will be lifted, and its spring will move it forward until the shoulder 91 engages the elevated stop. If the rod 84 is pulled, then the shoulder 92 comes into play. In the movement of the end 90 across the column of stops, the type plate moves to bring the letters from A to I inclusive into register. In the movement of the shoulder 91 across the column of stops the second division of letters is brought into play, and in the movement of the shoulder 92 the third division.

*Modification of voucher.*—The complete voucher shown in Fig. 13 contains spaces for the same items as the original voucher of Fig. 1, and in addition two spaces for the number of the creditor's bank and that of the debtor's bank, and a line for the debtor's signature. This card when sent to a debtor and signed by him constitutes a check drawn on his bank. Either his clerk or that of the creditor to whom the card is returned will punch the number of the debtor's bank. It will then be deposited in creditor's bank for collection, and by this bank transmitted to the debtor's bank, by whom the amount will be charged against the debtor's account. Each of the persons who handles the card will make a mechanical reproduction and listing, and no writing will be necessary except such signatures as are required by the several parties.

Instead of punching in one card a number for both a debtor and a creditor, I may omit one of these punchings, in which case the name of the party omitted (ordinarily the creditor's name) would preferably be printed on the card. As the principal function of the punchings corresponding to the debtor and the creditor is to shift the carriage or other part so as to print at the right or at the left, the reproducing mechanism will be modified in case one of said punchings is omitted. Supposing the debtor's space and corresponding punchings to be omitted, then the debtor's machine will be so arranged that if the punchings in the creditor's space do not correspond with his own number (that is to say, if it is not a card which he is sending out to some other debtor), the shift mechanism will be operated so as to print on the debit side of the ledger. The mechanism in fact may be so arranged as to stand normally in position to print debits, and to be shifted to print a credit only when a card is introduced which contains the user's number perforated in the creditor's space. The great advantage of this arrangement is the possibility of using fewer spaces upon a card. As shown, for example in Fig. 14, the omission of the debtor space permits a long distribution space, so long in fact as to permit of the use of letters of the alphabet instead of numbers for the different distributions.

For matter described and not claimed in the present application because relating to different inventions, reference is made to my other pending applications above referred to, and also to my applications Nos. 387,868 of August 9, 1907, and 396,970 of October 11, 1907.

Though I have described with great particularity of detail certain specific embodiments of my invention, yet it is not to be understood therefrom that the invention is restricted to the specific embodiments disclosed. Various modifications thereof in details and in the arrangement and combination of the parts may be made by those skilled in the art without departure from the invention.

What I claim is:—

1. Perforating mechanism including in combination a number of separately movable punches, means for setting each of said punches in position independently of the others, means for perforating the card with all said number of punches at one operation, and means for advancing a card by successive steps to positions for receiving perforations from such number of punches at each operation.

2. Perforating mechanism including in combination a keyboard, a carriage carrying a number of punches adapted to be set by said keyboard, and means for advancing said carriage to successive positions in which the punches in successive sections of said carriage are brought successively into operative relation with said keyboard.

3. Perforating mechanism including in combination a keyboard, a carriage carrying a number of punches adapted to be set by said keyboard, and means for advancing said carriage to successive positions in which the punches in successive sections of said carriage are brought successively into operative relation with said keyboard, and means for holding or releasing the punches of one section independently of those of another section.

4. Perforating mechanism including in combination a keyboard containing a series of columns of keys, a series of separate and independent punches in corresponding columns and set by the keys of said board, means for operating said punches, and means for preventing the operation of the punches in a column when no key in the corresponding column is operated.

5. A machine including in combination separate and indepedent punches for perforating a card and devices for printing thereon an indication corresponding to the perforation, a set of keys and mechanism actuated by each key for controlling both a printing and a perforating operation.

6. A machine including in combination separate and independent punches for perforating a card and devices for printing thereon an indication corresponding to the perforation, a set of keys and mechanism actuated by each key for setting a punching device and a printing device, and means for actuating said punching and printing devices.

7. A perforating and printing machine including in combination means for setting a number of punches and types in position, means for perforating and printing the card with all said number of punches and types at one operation, and means for advancing a card by successive steps to positions for receiving perforations and impressing from such number of punches and types at each operation.

In witness whereof, I have hereunto signed my name in the presence of two subscribing witnesses.

JOHN ROYDEN PEIRCE.

Witnesses:
ARTHUR C. PATTON,
DOMINGO A. USINA.